United States Patent [19]

Hattori et al.

[11] Patent Number: 4,552,329
[45] Date of Patent: Nov. 12, 1985

[54] CARBON FIBER-REINFORCED GYPSUM MODELS AND FORMING MOLDS

[75] Inventors: Yoshiaki Hattori, Yokkaichi; Makoto Ishihara, Ama, both of Japan

[73] Assignee: Noritake Co., Limited, Nagoya, Japan

[21] Appl. No.: 601,851

[22] Filed: Apr. 19, 1984

[30] Foreign Application Priority Data

Apr. 19, 1983 [JP] Japan .................................. 58-068954
Apr. 23, 1983 [JP] Japan .................................. 58-071963

[51] Int. Cl.⁴ ............................ B28B 1/26; B29C 5/00
[52] U.S. Cl. ........................................ 249/134; 425/84; 425/175; 264/337
[58] Field of Search .................... 249/134, 187 R; 264/337, 86; 425/DIG. 29, 84, 175

[56] References Cited

U.S. PATENT DOCUMENTS

| | | | |
|---|---|---|---|
| 2,303,303 | 11/1942 | Schleicher | 249/134 X |
| 2,988,456 | 6/1961 | Fairbanks et al. | 264/337 X |
| 3,295,818 | 1/1967 | Kreier | 249/134 |
| 3,317,178 | 5/1967 | Kreier | 249/134 |
| 3,460,606 | 8/1969 | Boddey | 249/134 X |
| 3,641,229 | 2/1972 | Lawrence | 249/134 X |
| 4,307,867 | 12/1981 | Shannon | 249/134 |
| 4,316,864 | 2/1982 | Bramwell | 249/134 X |

Primary Examiner—J. Howard Flint, Jr.
Attorney, Agent, or Firm—Wenderoth, Lind & Ponack

[57] ABSTRACT

Gypsum models and molds made of a gypsum structure uniformly dispersing therein carbon fibers having a predetermined length in a defined range of amount are described. The molds include various types of molds such as original mold, basic mold, forming mold and the like. A method for manufacturing these molds is also described in which sizing agents deposited on carbon fibers are decomposed and removed by heating or dissolution in solvent, separating the carbon fibers into single fibers in water, adding a major part of gypsum powder to the carbon fiber dispersed water to obtain a gypsum slurry dispersing uniformly those single fibers, and casting the slurry in a case mold to obtain forming molds. A method for manufacturing white wares is also described in which a pottery or porcelain slip is casted into the gypsum forming molds, removing the resulting green product from the mold after hardening and drying the green products. Gypsum powder materials comprising carbon fibers and a method for making the same are also described.

13 Claims, 19 Drawing Figures

CARBON FIBER-REINFORCED GYPSUM MODELS AND FORMING MOLDS

BACKGROUND OF THE INVENTION

1. Field of the Invention

This invention relates to gypsum models, original molds and forming molds, particularly gypsum molds for white wares or so-called plaster molds, which have an improved higher strength by dispersing a reinforcing material in gypsum structure. It also relates to gypsum powder materials for such models and molds and a method for producing the models and molds and the powder materials.

2. Description of the Prior Art

Various methods of increasing the strength of gypsum models, original molds and forming molds for general forming purpose (hereinafter, these molds are referred to simply as gypsum mold) have been known. One such method comprises mixing a major part of β-hemihydrate gypsum with a minor part of β-hemihydrate gypsum so as to reduce a water part, to gypsum materials. It will be noted here that hemihydrate gypsum may also be called plaster of Paris. Another method is known in which gypsum is admixed with cements or resins. In a further method, gypsum is admixed with natural fibers such as hemp, or glass fibers.

However, the first-mentioned method in which β-hemihydrate gypsum is admised with β-hemihydrate gypsum so as to reduce the water part is disadvantageous in that although the strength itself is slightly improved, the water absorbability which is essential for forming white wares lowers. Good water absorbability of gypsum molds particularly at the time of slip casting is one of the most important factors required for gypsum forming mold. If the water absorbability of a gypsum mold is poor, a forming time for one product is prolonged, thus lowering the forming productivity. Especially, when the water absorbability of the slip casting molds at the time of slip casting is poor, the resulting green products is ill-shaped. Thus, the lowering of the water absorbability in a gypsum forming mold is a vital drawback.

In the case where gypsum is admixed with cements or resins, the strength of the molds or models may be improved with an attendant disadvantage that the water absorbability lowers and the other their properties changes seriously. With the case of mixing gypsum with natural fibers such as hemp, natural fibers have so small a tensile strength as compared with synthetic fibers that an increase of the strength cannot be attained unless large amounts of the fibers are mixed to gypsum. The use of natural fibers in an increased amount accrues to a lowering of the water absorbability of the resulting gypsum mold. In addition, the single fiber of the natural fibers are so thick that the fibers incorporated in the surface portion of the gypsum mold are liable to expose their end portion at the forming faces. The exposed fiber ends at the forming faces may damage the surfaces of a forming products such as green ware and the portions where the fiber ends are exposed will lose water absorbability of the mold. Thus, the surface properties of the portions result in being uneven. In the case of the forming mold, the forming failure tends to occur because of this uneven surface.

The method of mixing glass fibers with gypsum will slightly improve the strength of the gypsum mold. However, when the ends of the glass fibers incorporating in the surface portions are exposed on forming faces, because of the rigidity of glass fibers, the surface of the forming products such as green ware may be damaged.

SUMMARY OF THE INVENTION

Broadly, the present invention provides a gypsum model i.e. patterns and mold which is made of a uniform mix of gypsum and a predetermined amount of carbon fibers with a predetermined length and a very small diameter which have excellent strength characteristics, flexibility, light weight, and low thermal expansion coefficient. By uniformly dispersing a relative small amount of carbon fibers into the gypsum structure, mechanical or physical strength of material dynamics and thermal durability of the model and mold are improved without a lowering of water absorbability, one of the important physical properties of forming molds for making white wares and paper wares, also without lowering or transforming other physical properties of models and molds for the other general purpose. In other words, the use of carbon fibers in combination with gypsum contributes to increase the strength of material mechanics, resulting in improving both a strength against external mechanical force (mechanical durability) and a strength against internal stress caused by thermal strain due to uneven temperature distribution in the products (thermal stability or durability).

It is accordingly an object of the present invention to provide gypsum models and molds of the just-mentioned types whereby without lowering various inherent properties of gypsum molds, the strength of material dynamics of the gypsum mold are increased, i.e. both a strength against external mechanical force and a strength against internal stress caused by thermal strain are improved at the same time. Consequently, breakage of the forming molds due to an external pressure or force imposed at the time of forming is not able to occur and, in the case of the forming using gypsum absorbability, for instance, the forming of the white ware and the paper ware, the gypsum forming molds can be dried at higher temperatures after every cycle of forming operations, enabling one to shorten the drying time resulting in improved forming ability per mold (productivity by the gypsum forming mold).

It is another object of the invention to provide a method for making a gypsum model and mold comprising carbon fibers as a reinforcement which comprises dispersing uniformly a multitude of single carbon fibers in a gypsum slurry, whereby the carbon fibers are uniformly dispersed in the structure of the gypsum model and mold.

It is a further object of the invention to provide a gypsum powder material, comprising a gypsum powder admixing uniformly with single carbon fibers in a predetermined mixing ratio.

Other objects and advantages and features of the present invention will become apparent from the following description.

DETAILED DESCRIPTION AND PREFERRED EMBODIMENTS OF THE INVENTION

Original gypsum molds or models in the present invention may include all gypsum models which are used in processing metals, non-metals or inorganic or organic materials by press work, forging, casting, cutting, grinding, laser work, and other various chemical and physical workings.

Biological or medical models such as internal organ which have no relations to processing of material, are also included.

Gypsum molds for forming to which the present invention is directed are almost all molds for forming and include not only gypsum molds for casting, especially precision casting or die casting press forming from powders and other plastic materials, extrusion forming, injection forming, but also gypsum molds for other plastic formings. Moreover, gypsum molds for forming are almost all molds for forming ceramics and include not only gypsum molds for forming, for example jiggering and casting, of white wares, porcelains and pottery, and refractory articles, but also gypsum molds for press forming, injection forming, slip casting, and the like formings of so-called fine ceramics, which are free of any clays upon preparation of starting materials, such as alumina, silicon carbide, silicon nitride, partially stabilized zirconia, Sialon and the like.

Also, the gypsum molds include all molds which are fabricated in a process on the way of manufacturing forming molds from original molds. Typicals of such molds are a basic mold and a case mold in the manufacture of a mold for forming white ware.

Carbon fibers used in the practice of the present invention may be made from polyacrylonitrile, pitches, rayons, and/or lignin-poval materials. In order to impart high or increased strength to gypsum molds, high strength or high elasticity carbon fibers are desirable. More particularly, carbon fibers have preferably a tensile strength not less than 200 kgf/mm$^2$ (kg/mm$^2$) and a tensile modulus not less than 20,000 kgf/mm$^2$ (kg/mm$^2$).

In the present invention, it is very important that carbon fibers which are apt to form lumps be uniformly dispersed into a gypsum slurry without producing lumps and be uniformly dispersed in gypsum structure to form a uniform matrix. To this end, carbon fibers incorporated into gypsum as a reinforcing material should have a predetermined length and a predetermined content to gypsum.

Carbon fibers are dispersed in the gypsum matrix in the form of single fibers. For the reasons described hereinafter, carbon fibers should have a length ranging from 5 to 100 mm, preferably from 20 to 30 mm.

Figure 1:
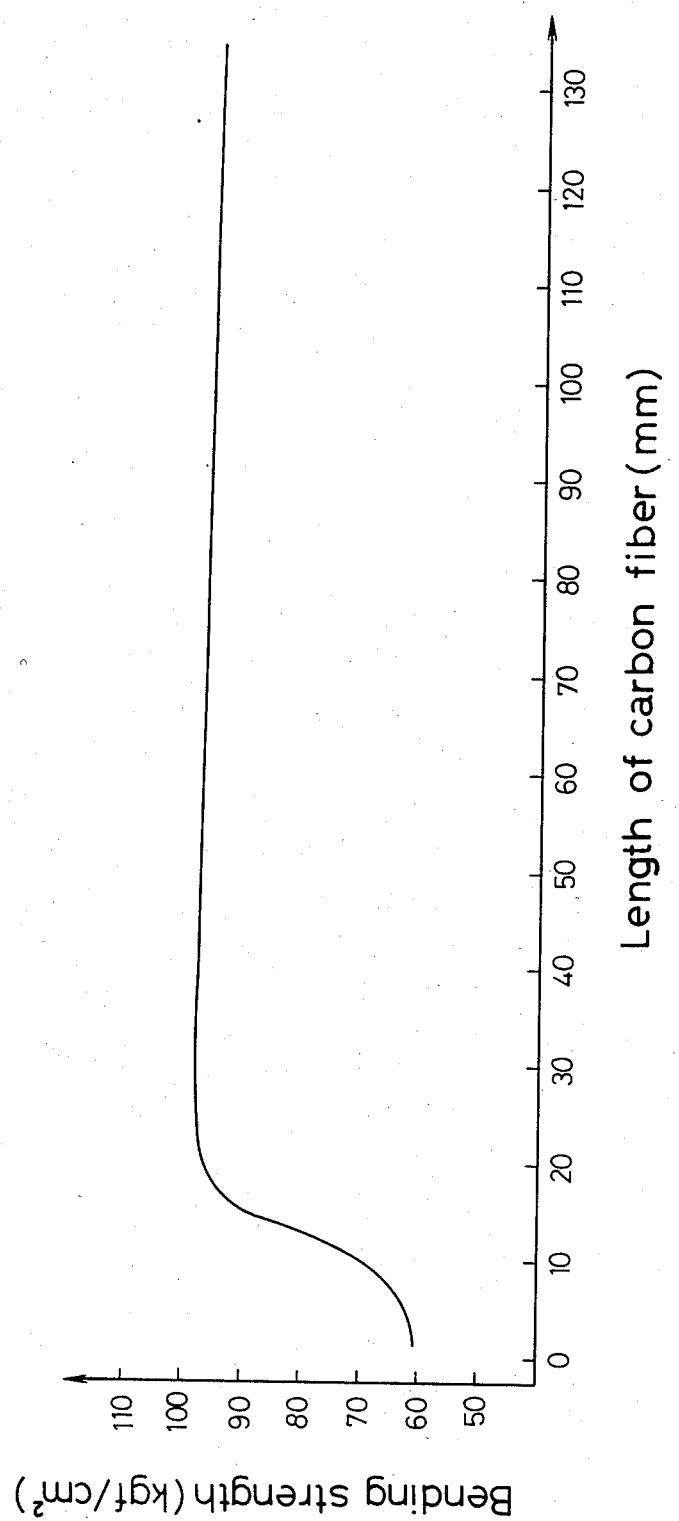
FIG. 1 is a graph showing the relation between the length of carbon fibers to be admised with gypsum and the bending strength of the gypsum test pieces.

Referring now to the accompanying drawings and particularly to FIG. 1. FIG. 1 shows test results showing the relation between bending strength (modulus of rupture) of a 15 mm×25 mm×250 mm gypsum test piece and length of carbon fibers. The test piece is made of a gypsum composition made of 100 parts by weight of gypsum, 60 parts by weight of water and 0.5 part by weight of carbon fibers. As will be clearly seen from this figure, the bending strength is abruptly lowered when the length is below 15 mm. The reason why the length of carbon fibers dispersed in the structure of the gypsum mold is determined in the range of from 5 to 100 mm is as follows: when the length is below 5 mm, the resulting gypsum mold is not satisfactorily improved in strength because of the insufficiency of total adhesion or contacting area between gypsum particles and single carbon fibers in the mold structure. On the other hand, lengths larger than 100 mm are disadvantageous in handling at the time when carbon fibers are separated into single fibers, when gypsum powder and water are mixed and agitated, and when the slurry is poured into a case mold. Consequently, uniform dispersion of carbon fibers into gypsum matrix is difficult.

The single carbon fibers for the purpose of the invention are obtained by the following steps. Firstly the carbon fibers produced by ordinary techniques, are cut into pieces having a length of from 5 to 100 mm, and then separated into a multitude of single fibers according to the following methods.

One such method of separating bundles of carbon fibers into single fibers is a method in which sizing agent applied onto the surfaces of a single fiber on the purpose to facilitate handling of the fibers, is removed, followed by dispersing them in water with supersonic agitation. For removing the sizing agent, the bundles of carbon fibers are heated in oxidizing atmosphere to oxidize and decompose or are washed with acetone solvent to dissolve and remove the sizing agent therefrom. Removal of the sizing agent by heating is carried out at temperatures depending on the type of sizing agent applied onto the surfaces. Conveniently, the heating temperature is about 300° C. which is a maximum temperature at which a majority of carbon fibers may be safely treated. The carbon fibers removed the sizing agent by heating are likely to be separated into a multitude of single fibers (usually 1,000 to 24,000 fibers) of a very small diameter (usually 5 to 10 microns).

The carbon fibers from which the sizing agent has been removed and which have been cut into pieces having a size of from 5 to 100 mm are charged into a water vessel and gently agitated by agitator blades applying ultrasonic oscillation. As the carbon fibers removed the sizing agent are easily separated in water, they disperse in water by the synergistic effect of the ultrasonic oscillation and the gentle agitation, into a multitude of single fibers having a very small diameter without producing any lumps. In order to avoid the carbon fibers from being damaged by means of the agitator blades in agitating, the agitating should be effected at 40 to 60 r.p.m. when the water vessel has a diameter of about 60 cm. After the dispersion, the separated single fibers are collected from the water vessel, followed by removing water therefrom and drying.

Figure 4:
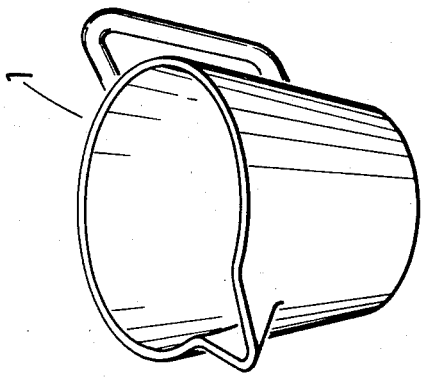
FIG. 4 is a schematic perspective view of a container for making a gypsum slurry.

An alternative method of separating bundles of carbon fibers into single fibers is a method of using the carbon fibers treated with a water-soluble sizing agent. More particularly, bundles of carbon fibers which have been treated with a watersoluble sizing agent are first cut into pieces having a length ranging from 5 to 100 mm and weighed to have a predetermined amount of carbon fibers required for one batch. The weighed carbon fibers are charged into a container 1, as shown in FIG. 4, having a predetermined amount therein for one batch. Then, the dispersion is gently agitated by means of rotating agitator blades whereupon the water-soluble sizing agent applied onto the carbon fibers are immediately dissolved in water and self-diffused. By the agitation with the impeller, thus, the bundles of carbon fibers are uniformly dispersed and separated into a multitude of single fibers with a very small diameter without producing any lumps. In this method also, the carbon fibers are prevented from being damaged by the agitator blades when the agitation is effected at 40 to 60 r.p.m. in the case of container having a diameter of about 60 cm. Thus, carbon fibers are separated into single fibers by this method, and a uniform dispersion of single carbon fibers in water is obtained in the container 1 as shown in FIG. 4. In this case, the dispersion may be subsequently admixed in the container 1 with a gypsum powder and additives such as a hardening retarder, i.e. curing retarder, a dehydrating agent, i.e. water reducer and the like in amounts sufficient for the batch, followed by agitating to obtain a gypsum slurry or slip.

For the production of a gypsum slurry having single carbon fibers dispersed or incorporated therein, in the above each method, the content of carbon fibers based on gypsum dry powder is in the range of from 0.01 to 1 wt % (about 0.008 to 0.9 wt % when calculated as a ratio of carbon fibers to the gypsum in cured gypsum mold), preferably from 0.1 to 0.3 wt %.

Figure 2:
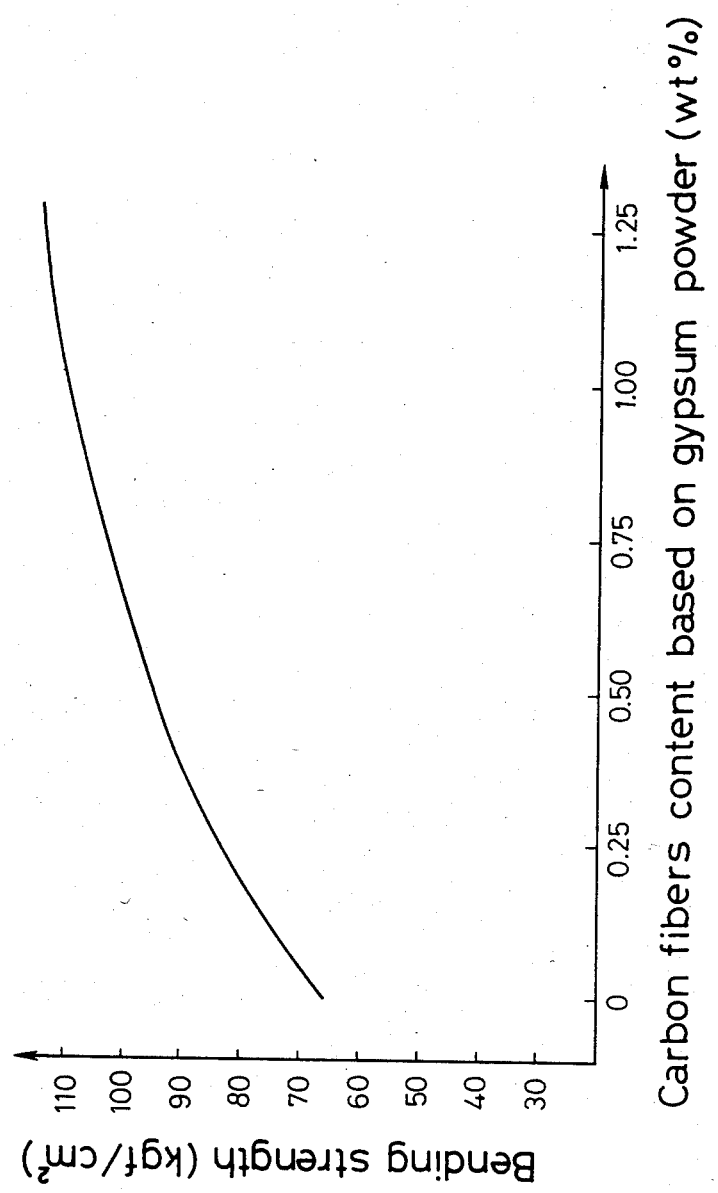
FIG. 2 is a graph showing the relation between weight percent of the carbon fibers content based on gypsum powder and the bending strength of the gypsum test pieces.
Figure 3:
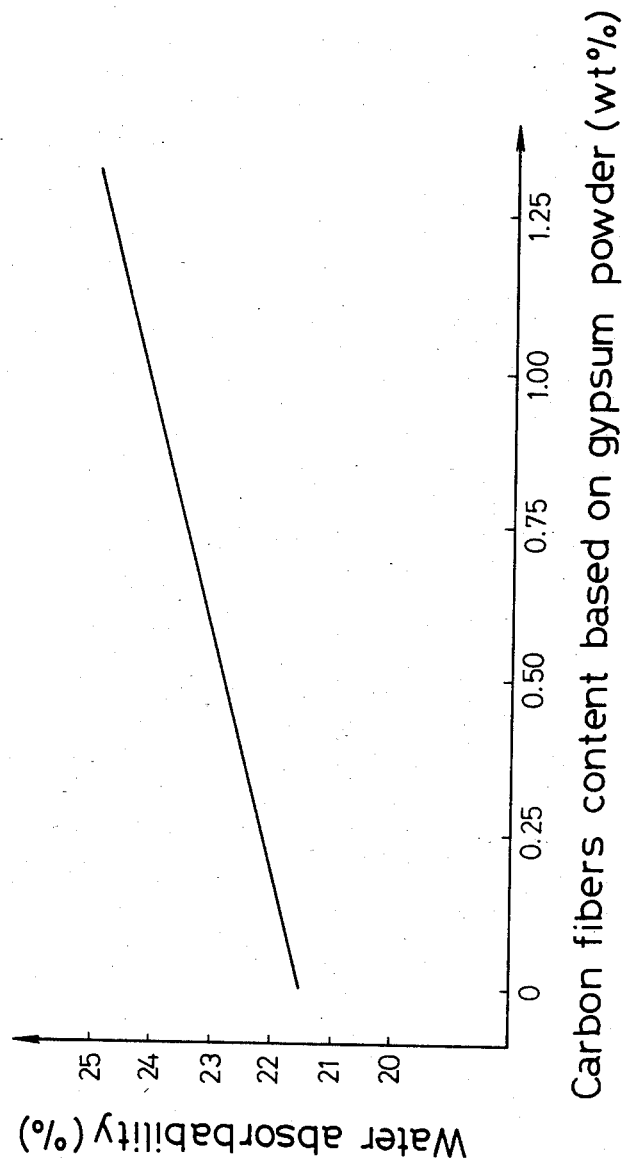
FIG. 3 is a graph showing the relation between the weight percent of carbon fibers content based on gypsum powder and water absorbability (weight percent of water to be able to be absorbed in the gypsum structure, to gypsum) of the gypsum products.

FIG. 2 shows the relation between the bending strength of a gypsum test piece and the content by wt % of the carbon fibers based on dry gypsum powder. The gypsym test piece is made of a composition comprising 100 parts by weight of gypsum powder, 60 parts by weight of water and the various amounts (parts by weight or weight percent based on gypsum dry powder) of the carbon fibers having a length of 20 mm and has a dimension of 15 mm×25 mm×250 mm. In FIG. 3, there is shown the relation between the water absorbability (weight % of the maximum absorbable water of the cured gypsum test piece) and the contents by wt % of the carbon fibers based on dry gypsum powder. As will be clear from the figures, the higher contents of carbon fibers result in the larger bending strength with the higher water absorbability.

The reason why the water absorability of the gypsum incorporated with carbon fibers increases is considered due to the fact: particles of gypsum have a needle-like shape and carbon fibers have a round or similar section; the size of gypsum particles is almost the same level as the diameter of carbon fibers; and hence gaps or voids are newly established among each carbon fibers and gypsum particles.

As indicated before, the content of carbon fibers in gypsum powder is defined to be in the range of from 0.01 to 1 wt %. Amounts less than 0.01 wt % are unfavorable because the ratio of the amounts of carbon fibers to gypsum powder is so low that the strength of the resulting gypsum mold is not satisfactorily increased. On the contrary, amounts more than 1 wt % are also unfavorable for the following reason. In preparing a gypsum slurry, carbon fibers are so much in amount that they cannot be uniformly dispersed in the slurry and tend to form lumps of the carbon fibers. Such slurry shows poor fluidity at the time of casting or pouring into a case mold and makes it difficult to handle. Moreover, physical properties such as water absorbability or capillarity of the gypsum mold obtained from the slurry change and, therefore, do not satisfy the requirements as the mold for forming white wares. Also in the cured gypsum mold, lumps of the carbon fibers tend to appear and they decrease the function as fine models or molds.

In order to suitably make a gypsum slurry uniformly dispersing therein carbon fibers from which any sizing agent has been removed as described above in the first, predetermined amounts of water and necessary additives such as a hardening retarder (curing retarder), a dehydrating agent (water reducer) and the like required for one batch, are firstly charged in the container 1 as shown in FIG. 4. Into the container are secondly introduced a predetermined amount of previously weighed single carbon fibers and finally a predetermined amount of gypsum powder. Subsequently, the container 1 is set on a vacuum agitator and the agitator blades are rotated at a low speed. Thus, a gypsum slurry in which the single carbon fibers uniformly disperse without forming lumps is obtained. The reason why carbon fibers are uniformly dispersed in the gypsum slurry without forming lumps is due to the fact that the ratio of amount of the carbon fibers to the gypsum is very small.

Figure 6:
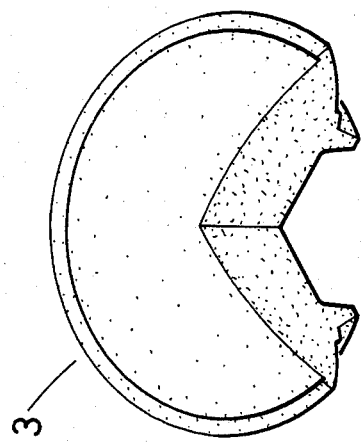
FIG. 6 is a schematic sectional view showing, partially broken, the gypsum forming mold of FIG. 5 for jiggering the flat white ware.
Figure 5:
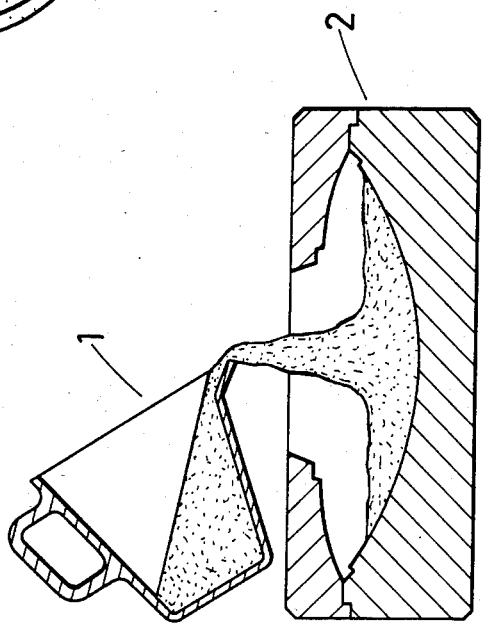
FIG. 5 is a schematic sectional view showing a forming step of making a gypsum mold for jiggering a flat white ware adapted to form an inner peripheral surface or portion of a dish ware.

For manufacturing gypsum molds for forming white wares, the gypsum slurry is then gently poured into a case mold 2 as shown in FIG. 5 and allowed to cure for predetermined time. After hardening, the case mold 2 is applied with a slight shock to be separated into two pieces, the upper and the lower, from which the resulting forming molds are removed, followed by sufficiently drying at a predetermined temperature. As a result, a gypsum mold 3 for jiggering a flat white ware, as shown in FIG. 6, which is adapted to jigger a dish is obtained. Carbon fibers have high flexibility and may be arbitrarily deformed after casting, so that they are considered to be naturally forced into the void gap among the particles of gypsum. Carbon fibers in the surface portions of the gypsum mold rarely expose their end portion to the surfaces of the mold. Even though carbon fibers externally exposed, they have such a small diameter and high flexibility that do not damage the surfaces of a green ware product therewith.

Figure 7:
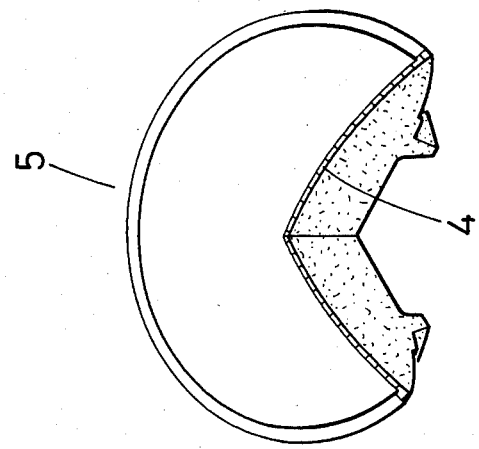
FIG. 7 is a schematic sectional view showing a forming step of making a gypsum mold for jiggering a flat white ware adapted to form an inner peripheral surface of a dish ware in which the outer peripheral surface of the mold is covered with a thin layer of pure gypsum.
Figure 8:
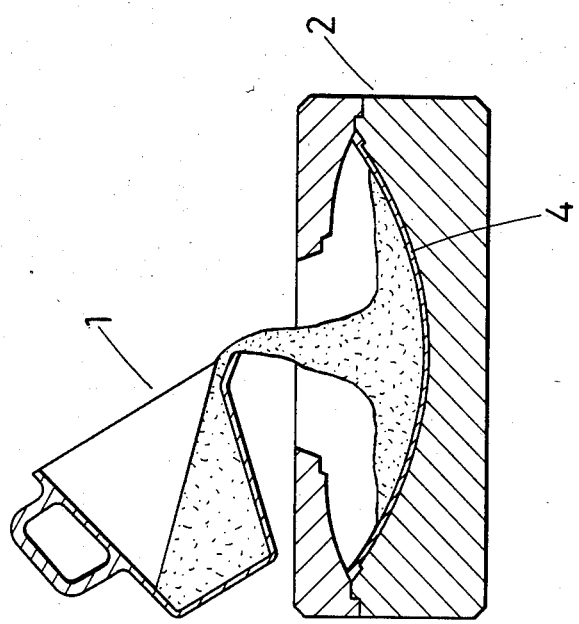
FIG. 8 is a schematic perspective view, partially broken, showing the gypsum forming mold of FIG. 7.

As described above, even though ends of carbon fibers in the gypsum mold are exposed on the surfaces of the mold, a green product suffers little damage on the surfaces thereof. In case it is necessary to obtain a very smooth green surface as white ware products of high quality, the case mold 2 is firstly formed with a 1 to 3 mm thick thin layer 4 of pure gypsum on its surface, as shown in FIG. 7. While pouring a small amount of the slurry of pure gypsum that does not contain any carbon fibers, the case mold 2 rotates at a low speed. Thereafter, the rotation of the case mold 2 is stopped. Then immediately, the gypsum slurry in which carbon fibers are uniformly dispersed is gently cast into the case mold 2 in the procedure as described with reference to FIG. 5. As a result of these two steps operation, a gypsum mold 5, as shown in FIG. 8, for jiggering of a flat white ware is obtained. This mold has the thin and fine layer 4 on the outer surface thereof which is a forming surface. By this, the exposed carbon fibers as described with reference to FIG. 5, are completely covered with the thin layer 4 and could not injure the fine surface of a green flat ware.

Figure 10:
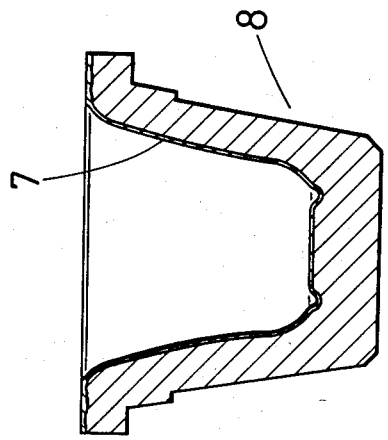
FIG. 10 is a schematic sectional view of the gypsum forming mold of FIG. 9.
Figure 9:
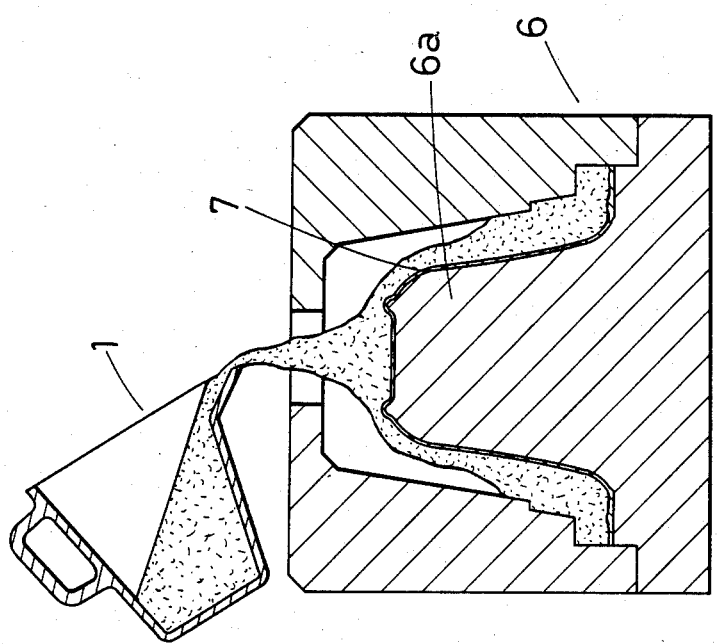
FIG. 9 is a schematic sectional view showing a forming step of making a gypsum mold for jiggering a hollow white ware adapted to form an outer peripheral surface of a cup ware in which the inner peripheral surface of the mold is covered with a thin layer of pure gypsum.

The gypsum mold 5 for flat ware jiggering is used to form an inner surface of a green ware product and is covered with the thin layer 4 of pure gypsum in order to prevent exposure of carbon fibers on the forming surface. In case of a gypsum mold for jiggering a hollow white ware, which is used to form an outer surface of a green ware, as shown in FIG. 9, also following two steps operations are applied. Firstly, a slurry of pure gypsum is poured into a case mold 6 while rotating the mold 6 at a low speed. A 1 to 3 mm thick thin layer 7 of pure gypsum is formed on an outer peripheral surface of a forming portion 6a (jiggering surface) of the case mold 6. Then, the case mold 6 is stopped rotating and a gypsum slurry uniformly dispersing therein carbon fibers is cast into the mold, followed by the process of curing, removing this forming mold from the case mold and drying the forming mold, as previously described with reference to FIG. 5. In this manner, the gypsum mold 8 for jiggering a hollow white ware, having the thin layer 7 of pure gypsum on the inner surface thereof as shown in FIG. 10, is obtained and is adapted to jigger a cup.

Figure 11:
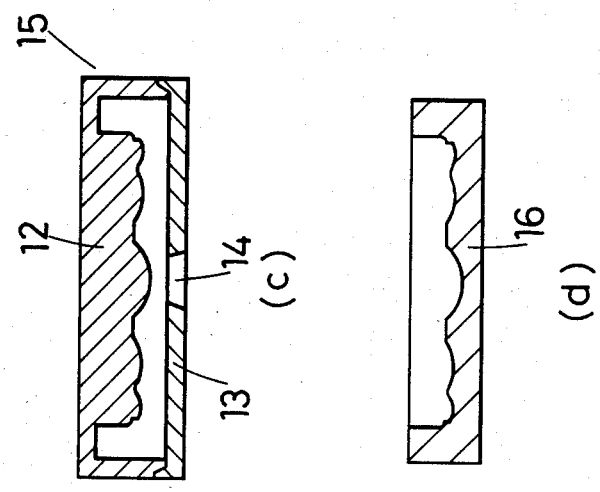
FIGS. 11(a) through 11(d) are schematic sectional views showing a process of manufacturing the gypsum molds for slip casting of the porcelain relief plate, including a model or an original mold in FIG. 11(a), the basic mold in FIG. 11(b), the case mold in FIG. 11(c) which is a female mold for the forming mold, and the forming mold for slip casting in FIG. 11(d) (these four types of the mold are called simply as the gypsum mold)

For the manufacture of a gypsum mold for slip casting a white ware plate with a relief pattern, a procedure consisting of four types of gypsum molds shown in FIGS. 11(a) through 11(d) is used. In FIGS. 11(a) through 11(d), an original mold or model 10 in FIG. 11(a), is firstly made. The original mold is made of a gypsum having the carbon fibers uniformly dispersed or an incorporated gypsum composition which is first made, the internal parts of the carbon fibers uniformly dispersed gypsum and second the outer surface of a pure gypsum. Secondly, a basic mold 11 as shown in FIG. 11(b) is duplicated from the original mold or would be reproduced after this original mold will not have been used.

The basic mold 11 is a female mold of the original mold and is also called "a master mold" in the case of precision metal casting. Thirdly, a gypsum female mold of the entire type of the basic mold 11 is fabricated and separated into the upper and the lower halves. As a result of separating, a female mold 12 having the upper male portion and a female mold 13 of the lower portion are obtained. The lower female mold 13 is designed to have a gypsum slurry inlet 14. The upper and lower female molds 12, 13 are combined to give a so-called case mold 15. Forthly, into the case mold 15, the gypsum slurry contained uniformly dispersed carbon fibers is cast from the inlet 14. When the charging of the gypsum slurry is effected at a normal or atmospheric pressure, the case mold 15 as shown in FIG. 11(c) has to be reversed. After completion of the casting, the slurry is allowed to cure for a certain time and hardened, after which the upper female mold 12 and the lower female mold 13 are separated from each other to obtain a forming mold 16. The carbon fiber-reinforced gypsum mold of the present invention has a reduced volume expansion in curing and also, a reduced thermal expansion coefficient at the end of curing. Therefore, in the whole process of the three duplicating production steps, it is possible to produce and duplicate the pattern of the molds with high accuracy, and with an almost no variation in dimension during these processes producing the forming mold from the original mold, if the carbon fiber-containing gypsum is used. This is also true of manufacturing the case molds for jiggering flat and hollow white wares which are afore-described, referring to FIG. 5, FIG. 7 and FIG. 9.

Preparation of a gypsum slurry having carbon fibers uniformly dispersed therein in a manner as described before, is somewhat troublesome in case only a very small amount of carbon fibers has to be exactly weighed at every cycle of preparing the slurry. To avoid this, carbon fibers which are light in weight, floating and hard to handle may be uniformly dispersed precedently in gypsum powder by utilizing either a circulating jet air stream or a swinging and rotating movement. This premixing will make it unnecessary to weigh a very small amount of carbon fibers for one batch at every cycle of preparing gypsum slurry.

The former method of mixing carbon fibers and gypsum powder by the use of a circulating jet air stream is particularly described following. Gypsum powder and carbon fibers being separated into single fibers are first charged into a mixer in a predetermined weight ratio. The mixture is then carried by the jet air stream and circulated a number of times through a closed line whereby the powder and the fibers are uniformly mixed. After the mixing, the mixture is collected from the air stream by means of a cyclone or bag filter to obtain a gypsum powder containing carbon fibers uniformly dispersed therein. The jet air streat should be controlled to have a pressure as low as 1 to 2 kgf/cm$^2$ (kg/cm$^2$). Higher pnuematic pressures are not favorable since gypsum particles are collided with one another or with carbon fibers at higher forces, so that the gypsum particles and the carbon fibers are both reduced into finer pieces, causing variation in physical properties as the gypsum mold.

Figure 12:
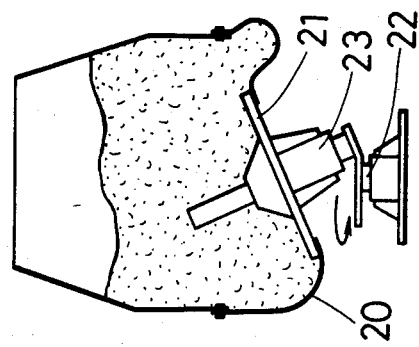
FIG. 12 is a schematic view showing the manner of mixing by movement of rotating and rocking.

The latter method of mixing using the swinging and rotating movement is illustrated in FIG. 12, in which gypsum powder and single carbon fibers are charged into a flexible bag 20 in a predetermined ratio. The bag 20 is swung and rotated through a swinging disc 21 attached at the bottom thereof. The disc has a swinging axle 23 concentrically mounted on a rotary shaft 22. When the rotary shaft 22 is rotated, the bag is swung and rotated and thus are mixing in the bag 20 is accelerated. The speed and direction of movement are abruptly varied in the designed manner, so that the gypsum powder and the carbon fibers are uniformly mixed. In the above operations of mixing carbon fibers with gypsum powder, a hardening retarder (curing retarder), a dehydrating agent (water reducer) and other necessary additives may be added simultaneously.

The gypsum mixture obtained above is a uniform mixture of carbon fibers separated into a multitude of single fibers with gypsum powder. If carbon fibers used are treated with a water-soluble sizing agent such as polyvinylpyrrolidone, polyvinyl alcohol or the like, it does not need necessarily that they are separated into single fibers. The reason why carbon fibers may be admixed in the form of bundles with gypsum powder in the bag is that in preparation of a gypsum slurry, the water-soluble sizing agents are dissolved and the carbon fibers are dispersed themselves in water. Moreover, on each occasion of the above-mentioned the higher content of carbon fibers than in use may be applied in admixing with gypsum powder. This mixture having a higher content of carbon fibers shall be further admixed with fresh gypsum powder to give a predetermined ratio of gypsum powder to carbon fibers, preceding the preparation of a gypsum slurry. According to this method, the cost of transport for the gypsum powder materials may be saved in behalf of the condensed carbon content.

When utilized as materials for general patterns, i.e. models and original molds, the gypsum composition comprising carbon fibers has so small volume expansion upon hardening by hydration and so small volume shrinkage in drying to succeed the hardening and removing the molds from the preceding mold such as a case mold in the case of forming mold, that when the patterns of these molds are repeatedly duplicated by casting into the preceding mold, i.e. parent mold (female mold), the resulting duplicated molds could have good accuracy. Moreover, the gypsum composition comprising carbon fibers has so small thermal expansion coefficient that these models and molds less expand and less shrink even if they suffer variation of temperature. Therefore, they could duplicate with good accuracy and the models could be a good model of patterns having high correctness.

Accordingly, repetition of the duplication several times gives good results because of the small difference in dimension between initial and final models or molds. This is the most important as a material for industrial model or original mold.

On the occasion of making the gypsum models, besides the above described casting methods, such heaping up or laying up methods as a hand-lay up method in forming fiber-reinforced plastics could be also applied by using the above described carbon fiber-dispersed gypsum slurry or more viscous paste-like slurry. Moreover, regarding the industrial huge patterns or models especially, it is preferable that they should have the higher strength, and frequently they need not have such fineness as the model or mold for manufacturing whiteware. Because of these reasons, the upper limitation in length of the chopped carbon fibers to be dispersed in a gypsum slurry can be 200 mm and the same in weight can be 2.0 wt % based on hydrated gypsum. Nearby this upper limit, though the uniform dispersion of carbon fibers into gypsum slurry becomes more difficult, the operation of forming or heaping up the models may be carried out effectively.

Examples of the present invention and Comparative Examples are described for the purpose of illustration only.

EXAMPLE 1

Polyacrylonitrile fibers were thermally treated at about 300° C. and further treated in an atmosphere of nitrogen gas at about 1300° C. for graphitization thereby obtaining carbon fibers in bundles each consisting of about 600 single fibers with a diameter of about 7 microns. The carbon fibers had physical properties of a tensile strength of 300 kgf/mm$^2$ (kg/mm$^2$), a tensile elastic modulus of 23,000 kgf/mm$^2$ (kg/mm$^2$), a density of 1.75 g/cm$^3$, a coefficient of linear thermal expansion of $-0.1 \times 10^{-6}$/°C., a thermal conductivity of 15 Kcal/m.hr.°C. (17.45 W/m.K), and a specific heat of 0.17 cal/g.°C. (0.71 kJ/kg·K). The carbon fibers were cut into pieces having a length of about 20 mm and were separated into a multitude of single fibers in water by application of ultrasonic oscillation and agitation. One hundred parts by weight of $\beta$-gypsum powder, 60 parts by weight of water, 0.1 part by weight of the carbon fibers and 0.2 part by weight of borax (hardening retarder) were mixed and agitated to obtain a gypsum slurry in which the single fibers were uniformly dispersed. The gypsum slurry was cast into a case mold to obtain a gypsum forming mold for jiggering a flat white ware. The thus obtained gypsum mold was found to contain the single fibers uniformly dispersed in or throughout the cut section in the direction of diameter. The state of dispersing the carbon fibers was visually recognizable.

EXAMPLE 2

A slurry dispersion in which single carbon fibers were uniformly dispersed was prepared using the same conditions and procedure as in Example 1. A pure gypsum slurry free of any carbon fibers was separately prepared and cast into a case mold while rotating the mold at a low speed, thereby forming a thin layer of 1 to 3 mm thickness on the inside surface of the case mold. Thereafter, the rotation of the case mold was stopped and the carbon fiber-containing gypsum slurry was cast into the case mold to obtain a gypsum forming mold for jiggering a white dish ware of the flat ware type. The outer surface of this forming gypsum mold which is a forming surface was covered with the thin film of pure gypsum. No carbon fibers were exposed on the forming surface of this forming mold.

EXAMPLE 3

Polyacrylonitrile fibers were treated with a heat treatment of about 300° C. and then subjected to special heat treatment for graphitization in an atmosphere of nitrogen gas at about 2500° C. Thus obtained single fibers having a diameter of about 7 microns were treated with a polyvinylpyrrolidone sizing agent and combined to give bundles of carbon fibers each consisting of about 6000 single fibers. The carbon fibers had physical characteristics of a tensile strength of 250 kgf/mm$^2$ (kg/mm$^2$), a tensile elastic modulus of 35,000 kgf/mm$^2$ (kg/mm$^2$), a density of 1.77 g/cm$^3$, a coefficient of linear thermal expansion of $-0.1\times10^{-6}$/°C., a thermal conductivity of 100 Kcal/m.hr.°C. (116 W/m.K), and a specific heat of 0.17 cal/g.°C. (0.71 kJ/kg.K). The bundles of the carbon fibers were cut into pieces of 25 mm and weighed such that 0.3 part by weight of the fibers per 100 parts by weight of gypsum powder was used. The thus weighed carbon fibers were charged into a container in which water was filled and were supplementarily agitated, whereupon the carbon fiber bundles were separated themselves into a multitude of single fibers and uniformly dispersed in water by agitation. Subsequently, β-gypsum powder, borax (hardening retarder) and Melment F-20, (water reducer), made by Showa Denko K.K., were further charged into the dispersion and agitated to obtain a homogeneous gypsum slurry having such a composition of 100 parts by weight of gypsum powder, 60 parts by weight of water, 0.3 part by weight of the carbon fibers, 0.2 part by weight of the hardening retarder, and 0.2 part of the water reducer. The gypsum slurry was cast into the case mold to obtain a gypsum mold for slip casting adapted to form an elliptical dish of white ware. The state of dispersion of the carbon fibers in the gypsum mold was almost the same uniform dispersion as in Example 1.

COMPARATIVE EXAMPLE 1

One hundred parts by weight of β-gypsum powder, 60 parts by weight of water and 0.2 part by weight of borax were mixed and agitated thereby otaining a pure gypsum slurry free of any carbon fibers. The slurry was cast into a case mold to obtain a gypsum mold for jiggering a flat white ware used to form a dish white ware.

Duplication of a model is described in the way of an example and a comparative example as follows.

EXAMPLE 4

Polyacrylonitrile fibers were treated with a heat treatment at about 300° C. and then subjected to special heat treatment for graphitization at about 1300° C. in an atmosphere of nitrogen gas. Thus single carbon fibers in the form of bundles each consisting of about 600 single fibers having a diameter of about 7 microns were obtained. The carbon fibers had physical characterristics of a tensile strength of 300 kgf/mm$^2$ (kg/mm$^2$), a tensile elastic modulus of 23,000 kgf/mm$^2$ (kg/mm$^2$), a density of 1.75 g/cm$^3$, a coefficient of linear thermal expansion of $\times0.1\times10^{-6}$/°C., a thermal conductivity of 15 Kcal/m.hr.°C. (17.45 W/m.K), and a specific heat of 0.17 cal/g.°C. (0.71 kj/kg.K). The carbon fibers were cut into pieces having a length of about 20 mm and separated into a multitude of single fibers in water by the synergistic action of ultrasonic oscillation and mechanical agitation. One hundred parts by weight of β-gypsum powder, 60 parts by weight of water, 0.1 part by weight of carbon fibers and 0.2 part by weight of borax (hardening retarder) were mixed together and agitated to obtain a gypsum slurry in which the single carbon fibers were uniformly dispersed. This gypsum slurry was cast into a gypsum female mold designed to duplicate a turbine blade of a gas turbine, thereby obtaining the duplicated male gypsum model. This gypsum model contained the single carbon fibers uniformly dispersed in or throughout the model including the cut sectional portions. The state of dispersion of the single carbon fibers was visually recognizable.

COMPARATIVE EXAMPLE 2

One hundred parts by weight of β-gypsum powder, 60 parts by weight of water and 0.2 part by weight of borax were mixed and agitated to obtain a pure gypsum slurry free of any carbon fibers. The thus obtained gypsum slurry was cast into a gypsum female mold designed to duplicate a turbine blade of a gas turbine, obtaining the duplicated male gypsum model.

The duplication accuracy between the female mold and the released male gypsum molds of Example 4 or Comparative Example 2, and the variation ratio at different temperatures are as follows.

As regards the duplication accuracy after releasing the model, the conventional product having no carbon fibers was found to be shrunk by 0.066 mm relative to 500 mm, whereas the inventive product was shrunk by as small as 0.018 mm to 500 mm. The variation ratio in length was as follows: the conventional product was expanded by 0.075% at the maximum exothermic temperature (53.2° C.), whereas the product of the invention was expanded by 0.066%. At room temperature (23.5° C.), the expansion of the conventional product 0.025%, whereas the expansion of the product of the invention was 0.018%. As will be clear from the above result, the product of the invention is less expanded after the hardening by hydration with the resulting duplication accuracy being good.

The gypsum molds obtained in Examples 1, 2 and 3 and Comparative Example 1 have physical characteristics including bending strength, water absorbability, temperature difference to rupture in air, bulk specific gravity and expansion ratio at the end of hardening, as shown in Table 1 below.

|  | Examples 1, 2 | Example 3 | Comp. Ex. 1 |
|---|---|---|---|
| Bending strength (kgf/cm$^2$) | 95 | 100 | 60 |
| Water absorbability (%) | 24.5 | 24.5 | 22 |
| Temperature difference to rupture (°C.) | 60–65 | 70–75 | 40–45 |
| Bulk specific gravity | 1.12 | 1.12 | 1.17 |
| Expansion ratio at the end of hardening | 0.12 | 0.12 | 0.17 |

The term "water absorbability" means a weight percentage of the maximum absorbed water to the weight of the wet test piece after a dried test piece was immersed in water at normal temperature and normal atmospheric pressure.

The term "temperature difference to rupture" means a minimum temperature difference between a heated temperature and room temperature, in case a test piece has broken down due to thermal stress exerted thereon when the test piece was heated to a given temperature in air and immediately after placed in a room for permitting the piece to stand at room temperature in atmospheric air.

The term "expansion ratio at the end of hardening" means a percentage of the variation in length of the casted gypsum mold to the preceeding mold, i.e. parent mold before drying and after hardening process where initially the casting becomes itself warm about 50° C. due to the exothermic reaction within about one hour, then it is laid at room temperature to be cooled till normal temperature, in the gypsum slurry casting and succeeding curing process. The above whole casting and succeeding curing process consists of casting a gypsum slurry into the preceeding mold, succeeding hardning accompanying with exothermic reaction, removing the casting from the preceeding mold after cooling, and drying or perfect curing for about three to seven days at 50° C. in a hot air dryer.

As will become apparent from the above table, the gypsum molds containing carbon fibers therein have much improved the bending strength and the temperature difference to rupture in air over the carbon fiber-free mold. The other physical characteristics are also improved.

Figure 14:
FIG. 14 is a picture of the gypsum mold composition in the case of using β-hemihydrate gypsum by scanning type electron microscope.

FIG. 14 is a two thousand multiplied picture took by the scanning type electron microscope from a replica of the cutting section in the gypsum forming mold of Example 1. The straight circular bar elongated from upper lefthand toward central portion is a single carbon fiber admixed in, and crystalline blocks as broken pieces are crystals of gypsum dehydrate produced from $\beta$-hemihydrate gypsum.

Figure 15:
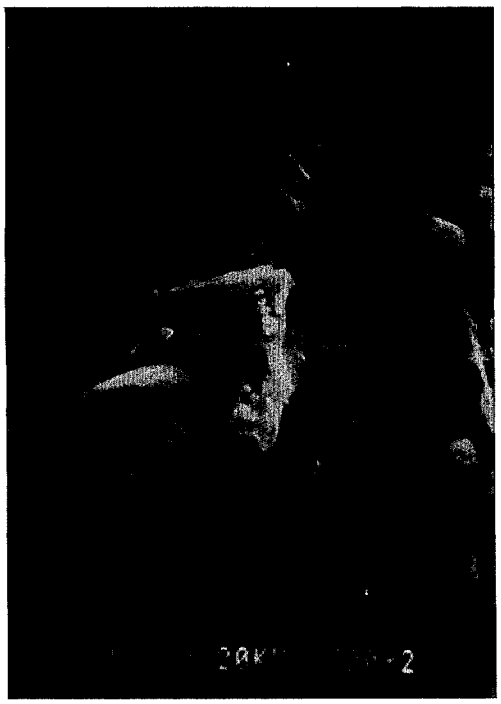
FIG. 15 is a picture of the same except using β-hemihydrate gypsum as FIG. 14.

FIG. 15 is also a two thousand multiplied picture took by the same scanning type electron microscope from the same as in Example 1, i.e. picture 1 except using $\alpha$-hemihydrate gypsum powder.

Figure 13:
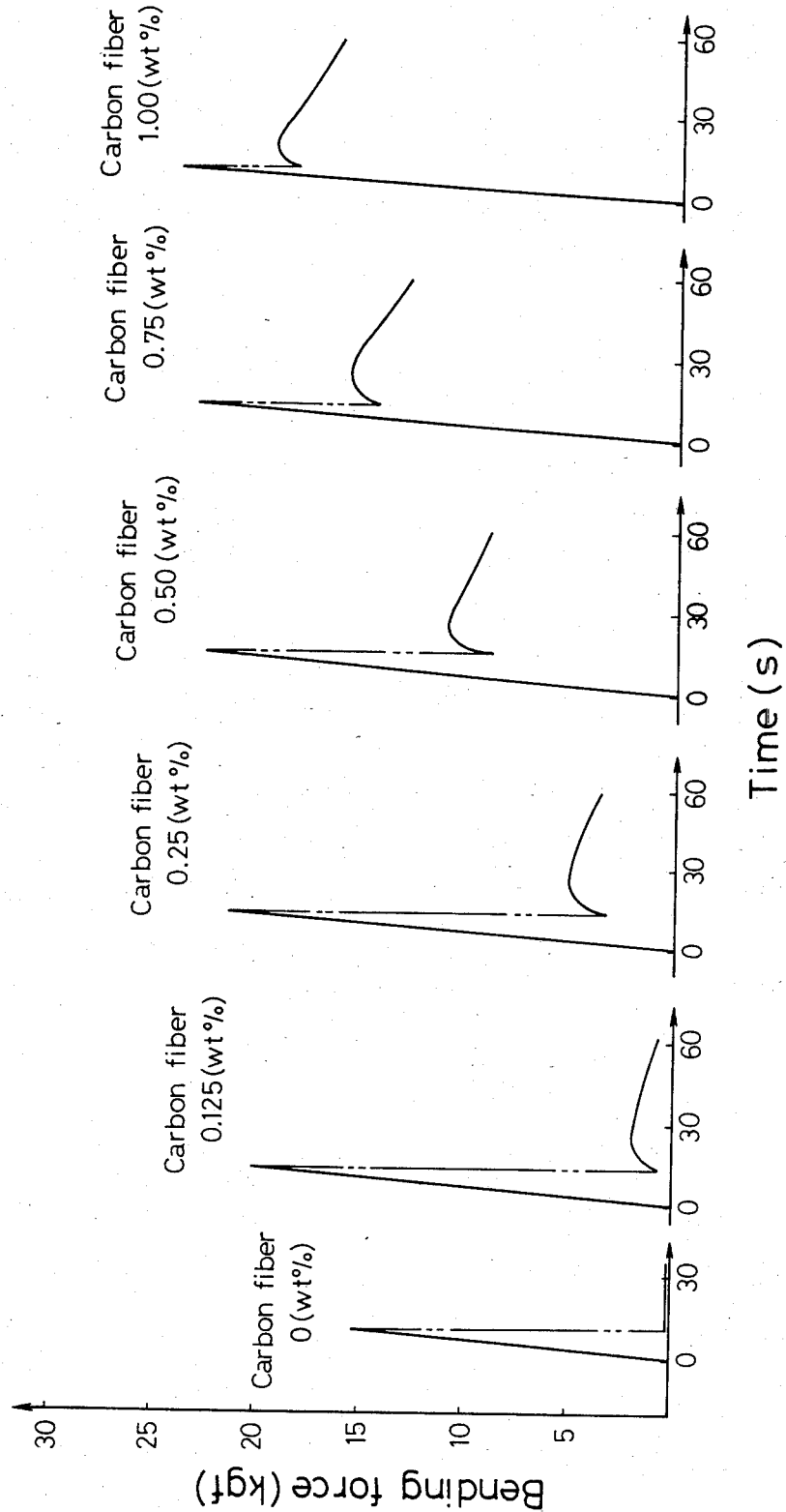
FIG. 13 is a graph showing the relation between bending force and the time under the certain test condition, i.e. the certain weight percent of carbon fibers in the gypsum structure as a parameter.

FIG. 13 shows the relation between bending force and elapsed time having made the bending tests the carbon fibers content as a parameter when using 15 mm×25 mm×250 mm gypsum composition test pieces each piece was bended by a bending tester under conditions indicated below. The gypsum test pieces are made from slurries of 100 parts by weight of $\beta$-gypsum, 60 parts by weight of water and different amounts of pitch carbon fibers with a length of 25 mm, succeeding by casting and drying to obtain a cured test piece. As will be apparent from FIG. 13, the higher content of the carbon fibers result in the greater bending force, solving the problem of simple rupture of the piece at the maximum bending force and ensuring toughness as a composition material. It will be noted that the test equipment had a span of 200 mm, a load was applied at the center of the test piece, and a displacement speed of the loading point was 1 mm/min.

Figure 16:
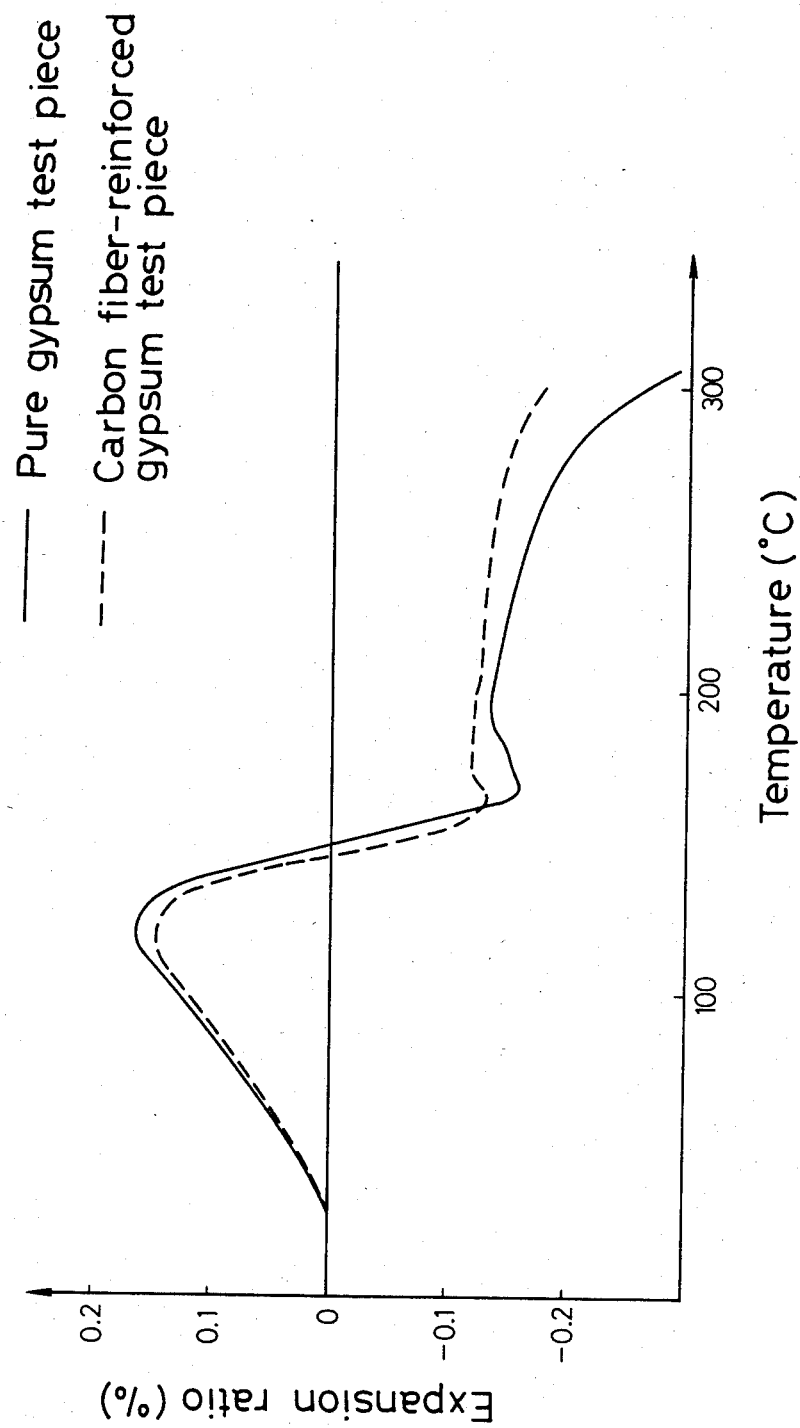
FIG. 16 is a graph showing the relation between expansion ratio, i.e., variation ratio in length, and temperature for a pure gypsum test piece and a carbon fiber-reinforced gypsum test piece, respectively.

FIG. 16 shows curves of a expanding variation percentage in length versus temperature for two different types of test pieces, a pure gypsum composition text piece and a carbon fiber-reinforced gypsum composition test piece, respectively. The variation ratio in length of the test piece of gypsum composition admixed with carbon fibers is slightly smaller as in each case of positive or negative expansion, in absolute value, than a variation ratio of the gypsum composition test piece free of any carbon fibers. Presumably, this is because carbon fibers whose thermal expansion coefficient is almost zero enter inbetween particles of gypsum and thus serve to suppress the expansion or shrinkage (or negative expansion) of gypsum. Accordingly, gypsum molds made of a mixture of gypsum and carbon fibers suffer thermal expansion or shrinkage only with a small degree in temperature variation of circumstance, therefore molded articles by these molds should have improved dimensional accuracy.

Because bending strength or resistive bending force are remarkably improved, the strength of material mechanics of the gypsum mold increases. Hitherto, known gypsum forming moldes are often broken by external pressure or mechanical force imposed to them in the process of forming. The portions of a gypsum forming mold which tended to be broken have increased strength, according to the invention, in mechanical strength, by which breakage of the carbon fiber-reinforced gypsum molds is prevented and a short cycle time of forming operation is possible, resulting an improvement of forming ability (productivity) per mold and a prolonged life of the gypsum forming mold. Breakage of a gypsum mold during forming may damage a forming machine and also interrupt the forming operation. This is suitably prevented by the use of the carbon fiber-reinforced gypsum forming mold. In addition, time required for re-adjustment after exchange of damaged parts of the forming machine or removing the broken gypsum mold and so on may also be saved. Much improved mechanical strength enables one to render a thickness of a gypsum mold small, reducing an amount of gypsum to be used.

The reason why the temperature difference to rupture in air is improved by admixutre of carbon fibers is considered as follows. The gypsum particle itself is expanding to a certain extent by temperature rise but the chopped single fiber of carbon fiber is little expanding. The carbon fibers in the structure of a gypsum mold is applied with a tensile force along the length thereof and the gypsum particles are compressed. As a result, internal stress is imposed on the carbon fibers along their length, thereby causing the state of introducing such prestress as a prestressed concrete, i.e. PS concrete.

A pronounced increase in the temperature difference to rupture in air means, especially for manufacturing white ware, that a gypsum mold is capable of using under the greater temperature difference between the drying temperature and the temperature of forming circumstance. For the forming, casting or jiggering, of white wares, a gypsum mold after forming can be dried at elevated temperatures. Accordingly, it is possible to shorten the drying time for each damped gypsum mold. A number of molds to be retained in a dryer are reduced resulting in an improvement of forming efficiency (productivity). This leads to the fact that a number of working gypsum molds to a number of formed white wares can be reduced. This fact, that is to say, use of the carbon fiber-reinforced gypsum, is suitable for manufacturing articles of various types in reduced amounts and can reduce the prime cost of final products.

In the case of jiggering white ware with the gypsum molds, in behalf of the improvement of the water absorbability, the time requiring from the completion of forming till the removal of the green ware from the mold is shortened. With the gypsum molds for slip casting of white wares, in behalf of this improvement, the time requiring for growing a green film from a casting slip is shortened. In both cases, the number of gypsum molds being retained in the forming and succeeding drying process are reduced with the forming efficiency being improved.

The lowering of the bulk specific gravity allows gypsum molds to be light in weight and thus contributes to improve ability of transporting and handling of gypsum molds. By only a slight reduction of the volume expansion ratio at the end of hardening, an expansion pressure exerted on case mold is reduced at the time of forming the gypsum forming mold for white wares, permitting the forming mold to be readily removed and preventing breakage of the case mold.

The above described advantages of the reduced volume expansion is also apparent in the case of duplicating model or any other mold than the white ware forming mold.

In view of the foregoing, the effects of the present invention may be summarized as follows.

(1) Strength of material mechanics of the gypsum mold is much improved. Breakage of the gypsum mold by external pressure exerted at the operation of forming is prevented and strength (i.e. durability) against the internal stress caused by a certain temperature difference is noticeably increased. For the forming of white wares or any other forming to use absorbability of the gypsum mold, the drying temperature of the damp gypsum mold can be raised, leading to reducing the drying time. Therefore, complete drying is possible resulting in remarkably increasing the forming efficiency.

(2) Carbon fibers having a very small diameter but large strength and high flexibility are used as a reinforcing material for gypsum mold. Such carbon fiber reinforced gypsum can increase strength against mechanical external force and uneven temperature distribution even though the mixing ratio of the fibers to gypsum is small. Because of the small mixing ratio of the reinforcing material, the water absorbability which is one of fundamental functions of gypsum mold for forming white ware, paper ware and so on by using absorbability does not lower by admixing the carbon fibers.

(3) When the surface layer portion of gypsum mold which is a forming surface covered with a thin layer or film of pure gypsum, it is completely prevented that the ends of carbon fibers are exposed on the forming surface, ensuring the resultant mold having a smooth surface.

(4) Carbon fibers which burn out by heating are used as a reinforcement. When the gypsum models or molds are broken in use or does not stand use, carbon fibers contained in the mold composition may be readily removed alone by crushing the models and molds, and succeeding gently heating the crushings taking a long time and the resultant gypsum crushings or hemihydrate gypsum may be reused. In this regard, if a reinforcing material which is not burnt out or not removed by heating such as glass fibers is used, it is very difficult or rather impossible to remove the admixed reinforcing material alone for regeneration or reuse of the gypsum models or molds.

(5) After cutting the carbon fibers into a predetermined length, a sizing agent deposited thereon is decomposed and removed by heating and the carbon fibers are agitated in water by gently rotating agitator blades applying ultrasonic oscillation, by which the bundles of very flexible carbon fibers with a very small diameter can be separated into a multitude of single fibers. By succeeding water separation, drying and admixing the prepared materials, the resulting gypsum slurry has a multitude of single carbon fibers dispersed uniformly therein and thus the carbon fibers are uniformly distributed in a gypsum model or mold.

(6) In case where carbon fibers treated with water-soluble sizing agents are used, they are charged into water, after cutting into a predetermined length, by which the water-soluble sizing agent is caused to be dissolved out in water. Therefore, the bundles of carbon fibers are instantly separated into a multitude of single fibers and dispersed into water by gentle agitating. The gypsum powder is charged into the dispersion and agitated thereby obtaining a gypsum slurry in which the single carbon fibers are uniformly dispersed. In this case, any pretreatment for separating bundles of carbon fibers into a multitude of single fibers is unnecessary.

(7) Carbon fibers are first cut into a predetermined length and separated preparatively into a multitude of single fibers. Gypsum powder and a predetermined amount of the single carbon fibers relative to the gypsum powder are charged in a circulation of jet air stream to uniformly premix them together. The mixture is then collected and air is separated to obtain a large amount of the powder mixture having a predetermined mixing ratio. This makes it unnecessary to weigh carbon fibers only in a small amount required for one batch in order to prepare a gypsum slurry.

(8) Conventionally, for the purpose of forming a fiber-reinforced composition, casting of a gypsum slurry into a preceeding mold is carried out as follows. A gypsum slurry is first cast into the preceeding mold, i.e. the mother mold to form a first surface layer with a thickness of 5 to 10 mm. On the first layer, a second layer is formed in the same manner of casting. Then such a chopped reinforcing fiber materials as hemp are scattered over the second cast layer and forced them into the cast layer of a gypsum slurry by fingers. As a result, the reinforcing fiber material are incorporated with the gypsum slurry in the cast layer. Subsequently, third and fourth layers are heaped up successively in the same manner as described the above to a predetermined total thickness.

In contrast with this, in the practice of the present invention, the carbon fiber reinforcing materials are dispersed preparatively in a gypsum slurry. The agitated carbon fiber premixed slurry is cast to form a relatively thick first layer, followed by merely casting the agitated slurry to form a second layer to a predetermined thickness. In other words, according to the present invention, a large amount of the slurry can be cast into the mold at a time, enabling the casting and working time to be shortened.

(9) The carbon fiber dispersed gypsum of the present invention has such a small volume expansion to the preceding mold at the time of hardening by hydration that in the manufacture of molds for forming white wares, errors are small in the duplication from an original mold, via a basic mold and a case mold to a forming mold. The resultant forming mold with high accuracy is obtained. The other forming mold, e.g., the mold for a die casting, a pulp slurry casting, a synthetic plastics injection, a fine ceramics isostatic pressing and so on, also can be duplicated in high accuracy.

(10) In manufacturing metal molds for casting metal materials such as "a precision metal casting", if the present invention of the carbon fibers dispersed gypsum composition is used instead of the metal molds that are a master mold, i.e. a mold duplicated the model (corresponding to a basic mold in manufacturing white ware), a preceding mother mold for the forming mold which is duplicated from the master mold (corresponding to a case mold in manufacturing white ware) and a forming mold, these 3 types of molds could be produced easily and precisely. Consequently, the products should be manufactured easily or instantly and precisely.

Namely, casted selling samples can be manufactured in extreme easiness and in high accuracy. Moreover, the application of the carbon fiber dispersed gypsum can be answered instantly and economically against change of the design thereafter, too.

Besides, comparing with a sand mold or a metal mold, the application of the present invention could assure a higher accuracy than each of these molds, and manufacture a fewer lots of products. Especially, the present invention is applicable to the production of a more variety and a fewer production such as die-casting moulding.

(11) In duplicating ordinary industrial model (original mold) repeatedly, it is possible to manufacture the duplicated original mold of an extremely small error in such high accuracy and fineness that even a fingerprint and a wood grain could be duplicated.

Comparing to a pure gypsum or a carbon fiberless gypsum composition, the invention of a carbon fibers dispersed gypsum composition provides the same less expansion in hardening and increased strength as described the preceding (9), so that a large or huge industrial model can be duplicated in high accuracy.

(12) Though, in the case of a complicated pattern such as containing engraving patterns of a deep under cutting pattern, it is necessary for the said portion of the complicated pattern in such an intermediary mold as a basic (master) mold and a case mold that the said mold surface is constituted by such a flexible material as silicone synthetic rubber, the present invention applying to the original mold or the forming mold should assure to be produced more extremely easily and more precisely than the some of a carbon fiberless gypsum composition.

(13) Carbon fibers have so soft and flexible that even though they are contained in a gypsum model or original mold, the surface is smooth with a suitable degree of softness. Accordingly, machinability of the model or original mold is good.

(14) Even in such a complicated pattern as containing an undercut, the model and the original mold of the invention are machined and engraved far and away more easily than a metallic or a wooden model and original mold. The resultant gypsum model or original mold are also duplicated easily and precisely, too. For instance, even such a fine pattern as a fingerprint or wooden grain could be duplicated faithfully and correctly.

Consequently, if only a little volume expansion (±0.1%) in hardening by hydration is allowed, the duplicated model could be used as a model, too. Thereby, in the case of wooden model reproducing cost of wooden model sample ordinarily used is saved.

Considering the viewpoint of producing a model itself instantly and economically, the invention is most preferable to production of the multiplex variety and the fewer products.

What is claimed is:

1. A carbon fiber-reinforced gypsum model comprising a gypsum structure of a matrix, said structure of a matrix comprising gypsum and from 5 to 200 mm long carbon fibers uniformly dispersed therein in the form of single fibers in an amount rainging from 0.008 to 2.0 wt % based on said gypsum.

2. A carbon fiber-reinforced gypsum model according to claim 1, wherein from 5 to 100 mm long carbon fibers is uniformly dispersed in the gypsum structure of a matrix in an amount of from 0.008 to 0.9 wt % based on said gypsum.

3. A carbon fiber-reinforced gypsum forming mold or its preceding molds, comprising a gypsum structure of a matrix, said structure of a matrix comprising gypsum and from 5 to 100 mm long carbon fibers uniformly dispersed therein in the form of single fibers in an amount ranging from 0.008 to 0.9 wt % based on said gypsum.

4. A carbon fiber-reinforced gypsum forming mold or its preceding molds according to claim 3, wherein said forming mold is a slip casting mold, a press forming mold, an extrusion forming mold, or an injection forming mold.

5. A carbon fiber-reinforced gypsum forming mold or its preceding molds according to any one of claims 3 through 4, wherein from 15 to 30 mm long carbon fibers are uniformly dispersed in the gypsum structure of a matrix in an amount of 0.05 to 0.3 wt % based on the gypsum.

6. A fiber-reinforced gypsum forming mold or its preceding molds comprising:
   (a) being applied to a forming method by using raw materials for pottery, porcelain or refractories, fine ceramics materials which are free from clay minerals, the other plastic raw materials or a pulp slurry for manufacturing paper wares;
   (b) being composed of a gypsum structure of a matrix, said structure of a matrix comprising gypsum and from 5 to 100 mm long reinforcing fibers uniformly dispersed therein in the form of single fibers in amount ranging from 0.008 to 0.9 wt % based on said gypsum.

7. A fiber-reinforced gypsum forming mold or its preceding molds, according to claim 6, wherein said forming mold is a slip casting mold, a press forming mold, an extrusion forming mold, or an injection forming mold.

8. A fiber-reinforced gypsum forming mold or its preceding molds, according to claim 6, wherein said forming mold is a forming mold for jiggering pottery or porcelain white wares.

9. A fiber-reinforced gypsum forming mold or its preceding molds, according to any one of claims 6 to claim 8, wherein said fiber is a carbon fiber.

10. A carbon fiber-reinforced gypsum model comprising a gypsum structure of a matrix said gypsum structure of a matrix comprising gypsum and from 5 to 200 mm long carbon fibers uniformly dispersed therein in the form of single fibers in an amount ranging from 0.008 to 2.0 wt % based on said gypsum, an external surface of said gypsum mold being covered with gypsum of less content of carbon fibers comprising with the content of carbon fibers in inner portion.

11. A carbon fiber-reinforced gypsum model according to claim 10, wherein from 5 to 100 mm long carbon fibers are uniformly dispersed in the gypsum of the matrix body in an amount of from 0.008 to 0.9 wt % based on the gypsum.

12. A carbon fiber-reinforced gypsum mold or its preceding molds for forming white wares comprising a gypsum structure of a matrix, said structure of matrix comprising gypsum and from 5 to 100 mm long carbon fibers uniformly dispersed therein in the form of single fibers in an amount ranging from 0.008 to 0.9 wt % based on said gypsum, a forming surface of said gypsum mold being covered with pure gypsum which is free from carbon fibers.

13. A carbon fiber-reinforced gypsum mold or its preceding molds, according to claim 12, wherein from 15 to 30 mm long carbon fibers are uniformly dispersed in the gypsum of the matrix in an amount of from 0.05 to 0.3 wt % based on the gypsum.

* * * * *